US008158922B2

(12) United States Patent
Anglikowski et al.

(10) Patent No.: US 8,158,922 B2

(45) Date of Patent: Apr. 17, 2012

(54) METHOD AND APPARATUS FOR A LIGHT FIXTURE HAVING A SECURITY LIGHT AND PERMANENTLY MOUNTED WALL-WASHING LEDS

(75) Inventors: Ronald Edward Anglikowski, Bowling Green, KY (US); David Scott Bullard, Bowling Green, KY (US); William Calvin Raper, Sparta, TN (US); Jeremy Lee Prichard, Cave City, KY (US)

(73) Assignee: HeathCo LLC, Bowling Green, KY (US)

( * ) Notice: Subject to any disclaimer, the term of this patent is extended or adjusted under 35 U.S.C. 154(b) by 0 days.

(21) Appl. No.: 12/038,230

(22) Filed: Feb. 27, 2008

(65) Prior Publication Data

US 2009/0212198 A1 Aug. 27, 2009

(51) Int. Cl.
*G01J 1/44* (2006.01)
*H05B 37/02* (2006.01)
*H05B 39/04* (2006.01)

(52) U.S. Cl. ................. 250/214 AL; 362/147; 362/227; 362/642

(58) Field of Classification Search .................. 362/641, 362/642, 227, 249, 251, 252, 147; 250/214 AL
See application file for complete search history.

(56) References Cited

U.S. PATENT DOCUMENTS

| | | | | |
|---|---|---|---|---|
| 5,598,066 | A | 1/1997 | Wiesemann et al. | |
| 6,022,125 | A * | 2/2000 | Bartasevich et al. | 362/228 |
| 6,227,679 | B1 * | 5/2001 | Zhang et al. | 362/236 |
| 6,821,010 | B2 * | 11/2004 | Lo | 362/555 |
| 6,909,239 | B2 * | 6/2005 | Gauna | 315/134 |
| 7,339,471 | B1 * | 3/2008 | Chan et al. | 340/541 |
| 2002/0153152 | A1 * | 10/2002 | Jarasse et al. | 174/50 |
| 2004/0083634 | A1 * | 5/2004 | Blsson et al. | 40/566 |
| 2007/0297169 | A1 * | 12/2007 | Holmes | 362/227 |

* cited by examiner

*Primary Examiner* — Francis M Legasse, Jr.

(74) *Attorney, Agent, or Firm* — Fitch, Even, Tabin & Flannery

(57) ABSTRACT

A light fixture (200) comprises a mounting fixture (501) that is configured and arranged to facilitate mounting the light fixture to a mounting surface other than ground along with at least a first light socket (502) and a plurality of permanently mounted light emitting diodes (LED's) (503). The light socket and the LED's are supported by the mounting fixture. The LED's are configured in an array and are oriented towards the mounting surface when the light fixture is installed on the mounting surface. This light fixture can further comprise an ambient light sensor (504), an animate object detector (505), and/or a timer (506). The wall-washing LED's can be switched on and off automatically (103) to provide the desired decorative effect during the evening hours. In addition, the light socket can be rendered controllable (105) as a function of whether it is dark out and whether an animate object has been detected.

34 Claims, 4 Drawing Sheets

METHOD AND APPARATUS FOR A LIGHT FIXTURE HAVING A SECURITY LIGHT AND PERMANENTLY MOUNTED WALL-WASHING LEDS

TECHNICAL FIELD

This invention relates generally to security lighting and to decorative wall wash lighting.

BACKGROUND

Artificial lighting serves numerous purposes. Security comprises one such purpose. It is known, for example, to employ lighting in areas where such lighting can serve to illuminate the approach and/or presence of unauthorized individuals and hence aid in discouraging such advances. Security lighting is bright enough to provide enough illumination to permit ready visual identification of an unauthorized person in the vicinity by an onlooker. As security lighting can require the consumption of considerable amounts of energy, it is also known to only trigger such illumination upon detecting the presence of such a person.

Another (completely unrelated) purpose served by artificial lighting is aesthetic improvement. One particular type of aesthetic improvement is wall washing. Wall washing typically employs lower candlepower light sources and serves to illuminate a non-moving surface of interest. Typical surfaces in this regard are often manmade external surfaces such as the exterior walls of building, landscaping walls, and the like. In a typical wall washing application the light is directed, exclusively or almost exclusively, towards the surface to be washed with light. Accordingly, wall washing lighting is neither bright enough nor aimed properly enough to provide enough illumination to permit ready visual identification of an unauthorized person in the vicinity by an onlooker.

Security lighting, of course, can have the ancillary effect of illuminating an exterior surface and wall washing can offer, in some cases, some small modicum of security functionality as well. Such small areas of overlap, however, are quite incidental; the primary purpose and effect of security lighting is to illuminate an unauthorized person in the vicinity of the light while the primary purpose and effect of wall washing is to provide an aesthetically pleasing decorative effect on a fixed surface.

BRIEF DESCRIPTION OF THE DRAWINGS

The above needs are at least partially met through provision of the method and apparatus for a light fixture having a light socket and permanently mounted wall-washing LEDs described in the following detailed description, particularly when studied in conjunction with the drawings, wherein.

Figure 1:
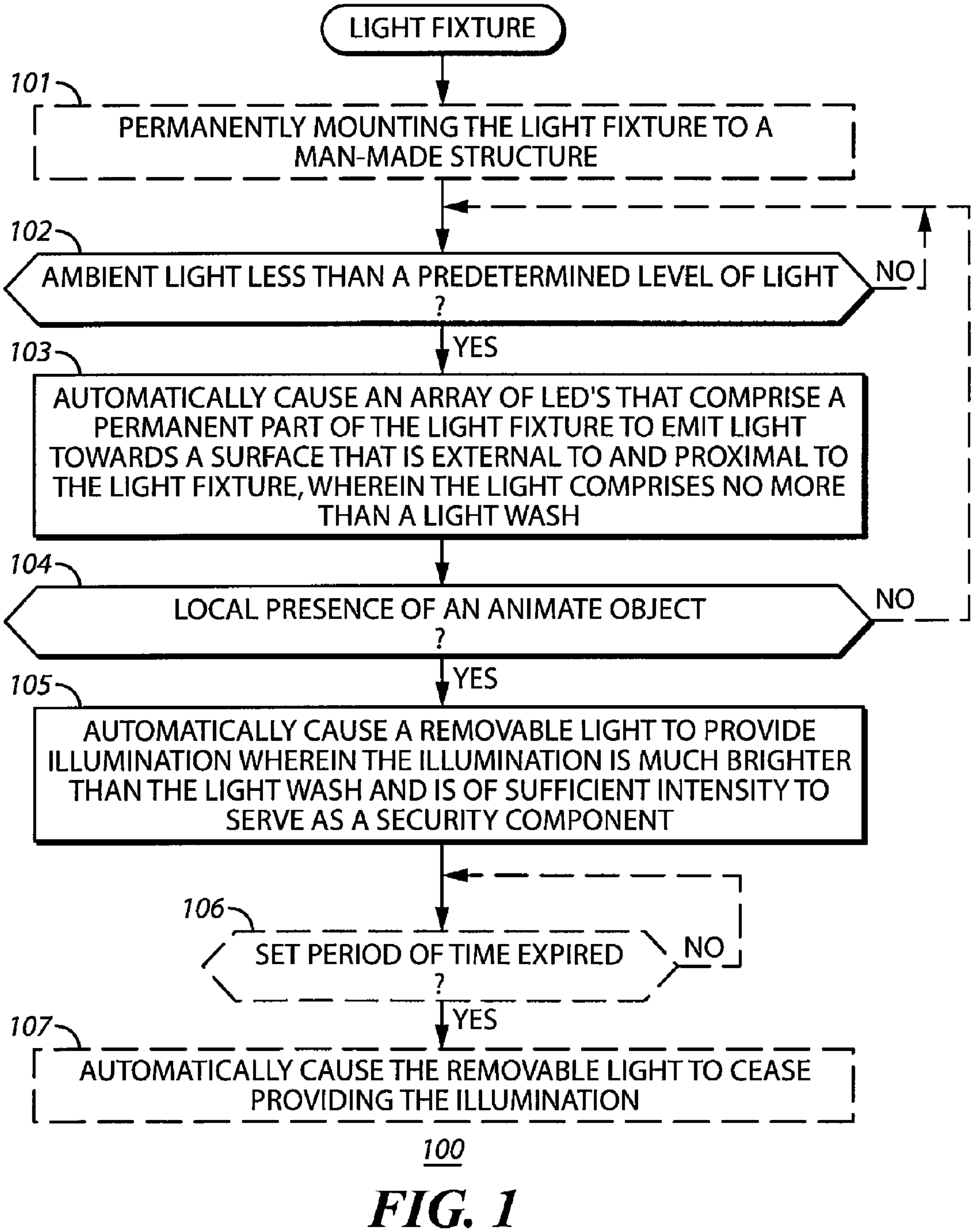
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a light fixture comprises a mounting fixture that is configured and arranged to facilitate mounting the light fixture to a mounting surface other than the ground along with at least a security light and a plurality of permanently mounted light emitting diodes (LED's). The security light and the LED's are supported by the mounting fixture. The LED's are configured in an array and are oriented towards the mounting surface when the light fixture is installed on the mounting surface.

So configured, the security light can support the use of a light source having a purpose other than wall washing while the permanently mounted LEDs serve a wall washing purpose. By one approach, the LED array can comprise various points along an arc. One or more lenses and/or diffusers can be provided to aid in achieving the wall washing effect. By yet another approach the LED array can be linear in form with one or more lenses creating the spreading of the light to create the wall washing effect.

Such a light fixture can be used with a variety of mounting surfaces including, for example, vertical walls, ceilings, overhangs, and so forth. A wide variety of lights can be selectively accommodated by choosing a corresponding light socket.

By one approach, this light fixture can further comprise an ambient light sensor, an animate object detector, and/or a timer. So configured, for example, the wall-washing LED's can be switched on and off automatically to provide the desired decorative effect only during the evening hours. In addition, the security light can be rendered controllable as a function of whether it is dark out and whether an animate object has been detected. By this approach, the security light comprises a security component. The timer can serve, in such an approach, to automatically deactivate the security light some predetermined period of time following its automated activation.

So configured, the benefits of both security lighting and decorative wall washing can be achieved in a compact, cost effective light fixture. The use of permanently mounted LED's for the wall washing permits this aesthetic purpose to be served with only a relatively low power requirement. The higher power requirements served by the security lighting, on the other hand, are only required during a time of likely need; i.e., when an animate object has been detected in the vicinity of the light fixture.

These and other benefits may become clearer upon making a thorough review and study of the following detailed description. Referring now to the drawings, and in particular to FIG. 1, an illustrative process that is compatible with many of these teachings will now be presented. This process 100 can be carried out in conjunction with a light fixture having the appropriate components to effect the indicated steps. The form factor of the light fixture can vary in accordance with the great multitude of options that are available in this regard. For the sake of illustration and not by way of limitation it will be assumed for the purposes of this description that this light fixture comprises a coach style lamp fixture unless otherwise indicated.

The bulk of this process 100 relates to the operations and functionality of the light fixture. As a preliminary optional step, however, this process 100 will also accommodate permanently mounting 101 the light fixture to a man-made structure. This man-made structure can comprise, for example, an exterior surface as comprises a part of a man-made structure. Those skilled in the art will understand that this reference to a man-made structure refers in general to the overall structure itself and does not comprise a necessary characterization of the materials of which the structure is comprised. Accordingly, for the purposes of this description, natural materials (such as wood or stone) which have also been shaped, placed, processed, and otherwise formed by human intervention into a man-made object will be understood to comprise a man-made structure.

Figure 2:
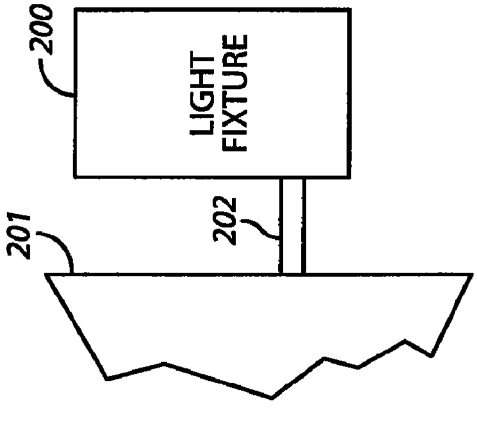
FIG. 2 comprises a side elevational detail schematic view as configured in accordance with various embodiments of the invention.

Referring momentarily to FIG. 2, by one approach, the light fixture 200 can be permanently mounted on a substantially vertical wall 201. In this example, where the light fixture 200 has a coach light form factor, a horizontal rod 202 (such as a canopy) serves to couple the light fixture 200 to the substantially vertical wall 201 while maintaining a certain displacement between the two. This wall 201 might comprise, for example, the exterior wall of a building, a landscape retainer wall, and so forth.

Figure 3:
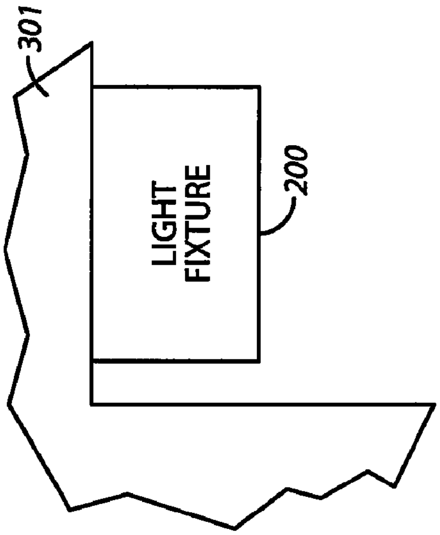
FIG. 3 comprises a side elevational detail schematic view as configured in accordance with various embodiments of the invention.
Figure 4:
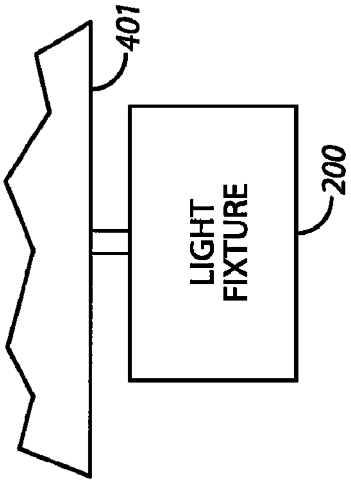
FIG. 4 comprises a side elevational detail schematic view as configured in accordance with various embodiments of the invention.

As another example, and referring now momentarily to FIG. 3, the light fixture 200 can be mounted to a mounting surface that comprises an overhang 301. In such a case the light fixture 200 can be mounted in abutment with the wall that supports the overhang 301 or can be displaced therefrom as illustrated. As yet another example, and referring now momentarily to FIG. 4, the light fixture 200 can be permanently attached to an interior surface of a ceiling 401. Again, as desired and as will be appropriate for many application settings, a certain amount of displacement between the light fixture 200 and the mounting surface can be provided.

As used herein, the expression "permanently" will be understood to refer to a mounting that is complete in and of itself and hence is intended to remain in place and to serve its intended purpose without requiring later replacement or support. The fact that a given mounting structure can be replaced, or might even be designed to be readily replaceable at the conclusion of its useful service life, shall be understood to not be inconsistent with this definition.

Figure 5:
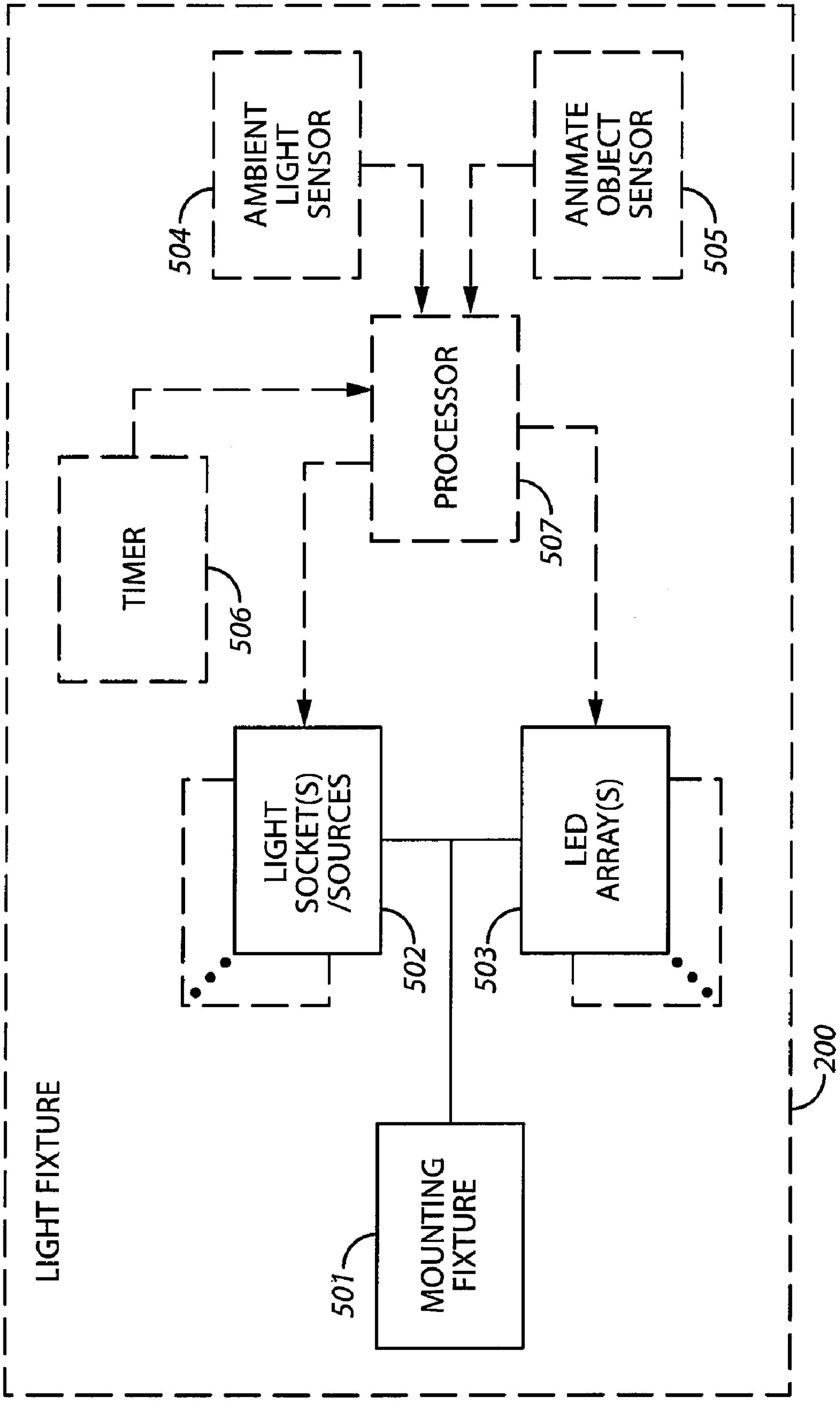
FIG. 5 comprises a block diagram as configured in accordance with various embodiments of the invention.

Referring now to FIG. 5, a general description of the light fixture 200 will be provided. The light fixture 200 comprises a mounting fixture 501 that serves, at least in part, to support at least a security element that comprises a first security light socket and/or a security light 502 and a plurality of permanently mounted LED's 503. This mounting fixture 501 can assume many different forms as will be well understood by those skilled in the art. In general, this mounting fixture 501 is configured and arranged to facilitate mounting the light fixture 200 (including specifically the components noted above) to a mounting surface other than the ground. This being the case, this mounting fixture 501 might comprise, for example, a rod that connects the light fixture 200 to a vertical wall as with a coach style light but would not comprise, for example, a vertical post that connects the light fixture 200 to the ground.

The light socket/source 502 can comprise any of a wide variety of known light sockets and/or light sources. The selection of a particular socket will often be a reflection of the particular light source that one wishes to employ in a given application setting. With this in mind, the light socket can be configured and arranged to compatibly receive lights that meet at least one of the following standards:

GU-24;
Edison screw base;
B bayonet base;
BA bayonet base;
G pin base;
GY pin base; and/or
Fluorescent lamp bi-pin base;

to note but a few examples in this regard. It will also be understood that these teachings can likely be employed with other socket standards that have yet to be developed. Those skilled in the art will appreciate that one or more LED's could also be employed here as a light source provided their light was bright enough (alone or in the aggregate) to serve the desired security function. For the purposes of this description, and again by way of illustration and not for limitation, it will be assumed that the light socket/source 502 comprises a fluorescent light socket/source. More particularly, this light socket will be of sufficient size and design to support the use of a light source that emits considerable light (and, in particular, light of sufficient intensity to serve as a security component).

By one approach, the LED array 503 can comprise an array of only one LED. By another approach, the LED array 503 can comprise a plurality of LED's that are permanently mounted to the light fixture 200. This might comprise, by one approach, permanently mounting (via, for example, soldering) each LED to a circuit board that comprises a permanent part of the light fixture 200. The number of LED's provided can vary, of course, with the application setting. A typical number of LED's might range from one LED to about twenty LED's. By one approach each of the LED's can exude a similarly colored light (such as a white colored light, though other color possibilities, such as green, red, or blue, are possible). By another approach at least some of the LED's can exude a different color (where, for example, half the LED's emit white light and the remaining LED's emit a green light). In such a case, the plurality of LED's will exude, in the aggregate, a plurality of differently colored lights.

Figure 6:
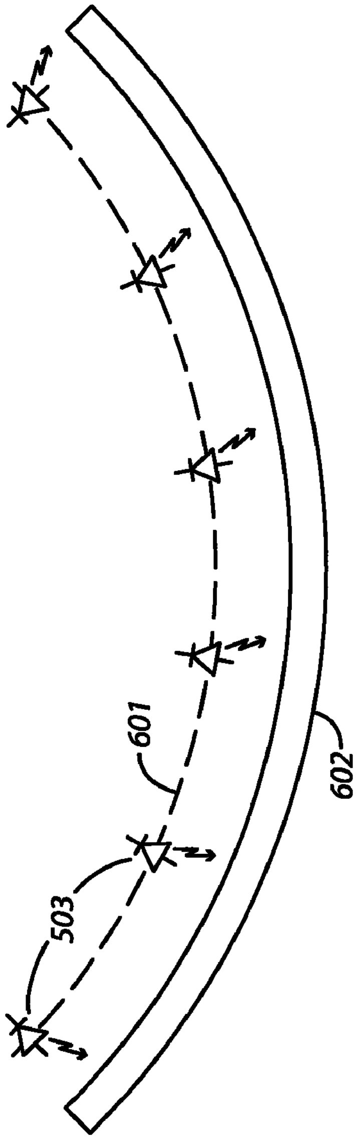
FIG. 6 comprises a top plan schematic view as configured in accordance with various embodiments of the invention.

Referring momentarily to FIG. 6, this array of LED's can comprise LED's that each comprise various points along an arc 601. This arc 601 can have a degree of curvature that suits the needs of a given application setting. By one approach, an arc of at least 45 degrees of curvature will prove useful for many application settings. By one approach, the LED's can all be disposed within a common plane that contains the arc 601. If desired, additional arc-positioned LED's can be provided where these arc-positioned LED's are stacked one atop the other to thereby form a multi-planar array of LED's.

If desired, a light-transmitting material 602 can be disposed between the LED's and the exterior of the light fixture 200. This light-transmitting material 602 can comprise one or more lenses to aid in directing the light from the LED's in a particular desired direction and/or a light diffuser to diffuse the light and thereby provide a more dispersed amorphous light output. Such lenses and diffusers are well known in the art and require no further description here.

Figure 7:
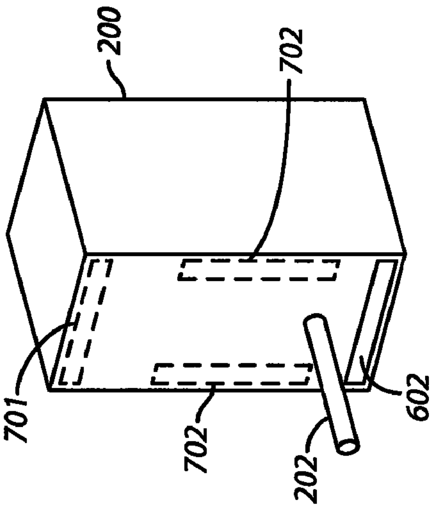
FIG. 7 comprises a rear perspective schematic view as configured in accordance with various embodiments of the invention.

Referring now momentarily to FIG. 7, and as noted earlier, these LED's can be installed on a backside of the light fixture 200. In this illustrative example, the light-transmitting material 602 is located along a lower edge of the backside of the light fixture 200 and the LED's are disposed on the interior side of the light-transmitting material 602 to permit their light to be washed over the adjacent surface. It would of course be possible to provide more than one such array of LED's if desired. For example, an additional such arrangement 701 could be provided towards the upper end of the light fixture 200. As another example, additional such arrangements 702 could be provided along the vertical edges of the light fixture 200.

It will also be understood that the light-transmitting material 602 and/or the corresponding LED's could be located along, for example, the sides, top, or bottom of the light fixture 200. Notwithstanding such a configuration, the orientation of the LED's and/or the directionality of the light-transmitting material 602 will be such to effect the wall washing intentions of these teachings.

Figure 8:
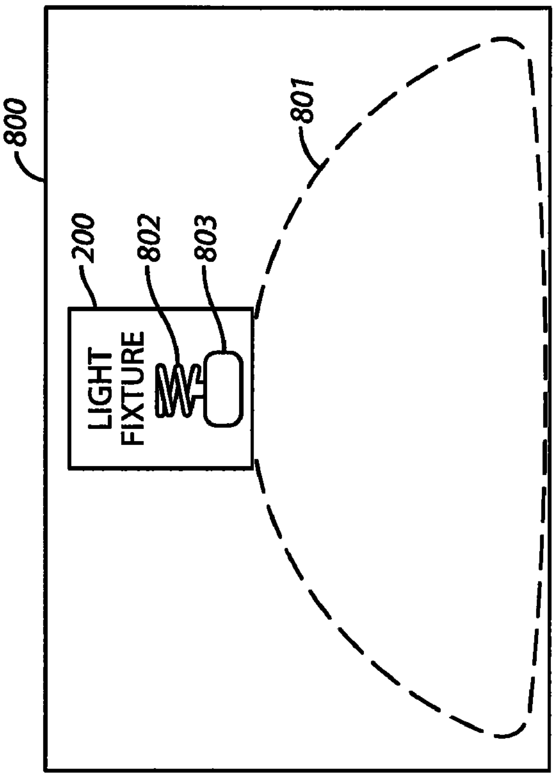
FIG. 8 comprises a front elevational schematic view as configured in accordance with various embodiments of the invention.

Referring now momentarily to FIG. 8, these LED's are configured in an array and then oriented towards the mounting surface 800 when the light fixture 200 is installed on the mounting surface 800 to thereby provide lighting that comprises no more than a light wash 801. So configured, the light from these LED's serves no other significant purpose such as illuminating nearby persons or the like. The security light, meanwhile, can comprise a socket 803 that receives a corresponding light source 802 that can, when illuminated, serve a purpose other than (or at least in addition to) washing the adjacent mounting surface 800 with light.

Referring again to FIG. 5, this light fixture 200 can also comprise additional components to support additional related functionality if desired. Such additional components can comprise, as illustrated, an ambient light sensor 504, an animate object detector 505, and/or a timer 506. Ambient light sensors of various kinds are known in the art. This includes light-sensitive semiconductor-based light sensors, essentially any of which will serve adequately for these purposes. Such an ambient light sensor 504 should preferable be located within or on the light fixture 200 so as to facilitate ready exposure of the sensor to ambient light within the external vicinity of the light fixture 200.

Animate object detectors of various kinds are also known in the art. These include, but are not necessarily limited to, movement detectors, thermal detectors, image-based detectors, and sonically-based detectors. The animate object detector 505 can comprise any one or more of any of these as desired. Generally speaking, the animate object detector should be disposed within the light fixture 200 so as to permit the detector having a coverage area that includes an area of interest to be monitored. By another approach, if desired, the detector can comprise a wireless module that is functionally connected to the light fixture. This can be general (as when the detector covers, for example, a 180 degree area of coverage or more) or specific (as when the detector's area of coverage is more constrained and focused) as may be appropriate to suit the needs of a given application setting. The animate object detector 505 may also be physically adjustable, if desired, to permit an installer to adjust the coverage area to thereby include an area of interest to be monitored.

Timers are also well known in the art and essentially serve the purpose of maintaining a periodic count by which an absolute or relative measure of passing time can be gauged.

Again, such components are well known in the art. Various approaches are known in the art in these regards. As these teachings are not overly sensitive to any particular selections in these regards, for the sake of brevity and the preservation of clarity, further elaboration in these regards will not be presented here.

The inputs from these various components, when available, can be processed in various ways (including those ways that are disclosed further herein). By one approach, to facilitate such processing, the light fixture 200 can further optionally comprise a processor 507 that operably couples to each of these components as well as to the security light socket 502 and the LED array 503. Those skilled in the art will recognize and appreciate that such a processor can comprise a fixed-purpose hard-wired platform or can comprise a partially or wholly programmable platform. All of these architectural options are well known and understood in the art and require no further description here.

Those skilled in the art will recognize and understand that such an apparatus may be comprised of a plurality of physically distinct elements as is suggested by the illustration shown in FIG. 5. It is also possible, however, to view this illustration as comprising a logical view, in which case one or more of these elements can be enabled and realized via a shared platform. It will also be understood that such a shared platform may comprise a wholly or at least partially programmable platform as are known in the art.

Referring now again to FIG. 1, the aforementioned process 100 can determine 102 when ambient light is less than a predetermined level of light. This can comprise, for example, determining when the ambient light is less than a dusk-level of ambient lighting. By one approach, this step can comprise comparing readings from an ambient light sensor against a corresponding threshold (such as, for example, a threshold that corresponds to the aforementioned dusk-level of ambient lighting). In the absence of such a determination, the process 100 can continue in some other preferred approach and/or can continue to iteratively make this determination 102.

When the ambient lighting is less than the predetermined level, this process 100 then automatically produces a first trigger that causes 103 the array of LED's 503 that comprise a permanent part of the light fixture 200 to emit light towards a surface that is external to and proximal to the light fixture 200. By one approach, this light that is emitted towards this surface comprises no more than a light wash.

This state of illumination for the LED's 503 can continue, if desired, until ambient lighting conditions indicate a sufficient lightening. The aforementioned threshold can be used for this purpose or a different threshold (which is either darker or lighter than the original threshold) can be employed if desired. By another approach, if desired, the aforementioned timer can be used to cause the LED's 503 to be switched off after the passage of some predetermined amount of time, such as four hours, eight hours, or any other period of time as may be useful in a given application setting.

So configured, the light fixture 200 will automatically provide a highly effective and energy efficient source of decorative wall washing during evening hours. Such lighting can serve as an important component of an esthetically pleasing landscaping presentation.

This process 100 can also then monitor to detect 104 a local presence of an animate object (such as an unauthorized individual or group of individuals) to thereby provide a second trigger. By one approach, the animate object detector 505 is switched off during daylight hours and hence such a detection event will not occur during such times. By another approach, the animate object detector 505 can remain operable during such times but the process 100 can provide for not responding to this second trigger when the second trigger occurs during the evening hours.

When a local presence of an animate object is detected 104 at a time when the ambient light is less than the predetermined level of light, this process 100 then provides for automatically causing 105 the security light socket/source 502 (when fully installed, of course) to provide illumination. This illumination is much brighter than the light wash provided by the LED's 503 and is of sufficient intensity to serve as a security component. This means, at least in part, that the light from the removably installed light source is sufficiently bright and sufficiently directed so as to cause the animate object to be sufficiently illuminated to permit ready visual identification of the animate object by an onlooker.

As used herein, this reference to being "removably" installed will be understood to a consumable component having an operational lifetime that is considerably shorter than the operational lifetime of the apparatus with which the component is associated, where the interface between the apparatus and the component is designed to readily accommodate an easy and accessible exchange of the component for a replacement component. This notion will not, therefore, include components that, while possibly "removable" in some absolute sense of the word, are not removable without corresponding difficulty and/or damage to the apparatus itself. For example, this notion of "removable" would not include a component that was soldered in place within the apparatus but would include an easily accessible battery that is placed within a standard battery compartment.

By one approach, the removably installed light source can be continuously illuminated until the triggering condition is no longer sensed. By another optional approach, the process 100 can utilize the timer 506 to determine 106 when a predetermined set period of time (such as, for example, five minutes) has expired. When this period of time expires, this process 100 can then optionally consider this a third trigger event and respond by providing for automatically causing 107 the removably installed light to cease providing the aforementioned security illumination.

So configured, those skilled in the art will recognize and appreciate that these teachings provide for an effective, cost sensitive, energy efficient approach to providing both decorative wall washing illumination and security-based illumination in a single light fixture. These teachings are readily leveraged to accommodate a wide variety of light sources including lights having different colors and light sources having varying levels of illuminatory output. These teachings are also readily scaled to accommodate light fixtures of varying sizes, surfaces to be wall washed of varying sizes, and security zones of varying sizes.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A light fixture comprising:

a mounting fixture configured and arranged to facilitate mounting the light fixture to a mounting surface other than ground;

a security element comprising at least one of a first security light and a security light socket that is supported by the mounting fixture, the security element being positioned to direct light from the first security light in a first direction away from the mounting surface; and a plurality of light emitting diodes (LEDs) mounted on the mounting fixture, the plurality of LEDs having light emitting portions that are oriented to direct light along a line which is generally perpendicular to and towards the mounting surface and generally opposite the first direction when the light fixture is installed on the mounting surface.

2. The light fixture of claim 1 wherein the mounting surface comprises a substantially vertical wall.

3. The light fixture of claim 1 wherein the mounting surface comprises an interior surface of a ceiling.

4. The light fixture of claim 1 wherein the mounting surface comprises an overhang.

5. The light fixture of claim 1 wherein the mounting surface comprises an exterior surface of a man-made structure.

6. The light fixture of claim 1 wherein the security light socket comprises a fluorescent light socket.

7. The light fixture of claim 1 wherein the security light socket is configured and arranged to compatibly receive lights that meet at least one of the following standards:

GU-24;

Edison screw base;

B bayonet base;

BA bayonet base;

G pin base;

GY pin base;

fluorescent lamp bi-pin base.

8. The light fixture of claim 1 wherein the plurality of LEDs exudes a similarly colored light.

9. The light fixture of claim 1 further comprising:

an ambient light sensor that is operably coupled to the plurality of LEDs;

and wherein the plurality of LEDs are configured and arranged to illuminate when ambient light is less than a corresponding threshold.

10. The light fixture of claim 1 further comprising:

an animate object detector that is operably coupled to the security element, such that when fully installed the security element becomes electrically live when the animate object detector detects an animate object.

11. The light fixture of claim 1 wherein the light fixtures comprises a coach style lamp fixture.

12. The light fixture of claim 1 wherein the first security light comprises a plurality of light emitting diodes.

13. The light fixture of claim 1 wherein the mounting fixture is configured to be permanently mounted to the mounting surface.

14. The light fixture of claim 8 wherein the color is white.

15. The light fixture of claim 8 wherein the plurality of LEDs exude, in the aggregate, a plurality of differently colored lights.

16. The light fixture of claim 8 wherein the plurality of LEDs comprise an array of LEDs disposed at various points along an arc.

17. The light fixture of claim 16 wherein the arc comprises at least 45 degrees of curvature.

18. The light fixture of claim 9 wherein the threshold corresponds to a dusk-level of ambient lighting.

19. The light fixture of claim 10 wherein the animate object detector comprises at least one of:

a movement detector;

a thermal detector;

an image-based detector;

a sonically-based detector.

20. The light fixture of claim 10 further comprising:

an ambient light sensor that is operably coupled to at least one of the animate object detector and the security element, such that when fully installed the security element does not become electrically live when the light fixture is in a presence of a sufficient level of ambient light even when the animate object detector detects an animate object.

21. The light fixture of claim 10 further comprising:

a timer operably coupled to the security element when the unit is fully installed, such that the security element becomes electrically dead a predetermined period of time following when the security element becomes electrically live in response to the animate object detector detecting an animate object.

22. A security light fixture comprising:

a mounting housing configured and arranged to mount the light fixture to a mounting surface other than ground, the mounting housing having a front and back, the housing including a light socket configured to direct a security light from a security light socket from the front and orienting the security light away from the mounting surface; and a plurality of light emitting diodes (LED)s on the back of the housing, wherein the plurality of LEDs have light emitting portions that are oriented towards the mounting surface to direct light towards the mounting surface in a direction generally opposite to the direction of light from the security light when the light fixture is installed on the mounting surface.

23. The light fixture of claim 22 wherein the plurality of LEDs are disposed at various points along an arc.

24. The light fixture of claim 22 further comprising:

an ambient light sensor that is operably coupled to a plurality of LEDs, the plurality of LED's being configured to illuminate when ambient light is less than a corresponding threshold.

25. The light fixture of claim 22 further comprising:

an animate object detector that is operably coupled to the security element such that the security element becomes electrically live when the animate object detector detects an animate object.

26. The light fixture of claim 23 wherein the arc comprises at least 45 degrees of curvature.

27. A security light fixture comprising:

a mounting housing configured and arranged to mount the light fixture to a mounting surface other than ground, the mounting housing having a front and back, the housing including a light socket configured to point a security light from the front and away from the mounting surface and the back facing the mounting surface;

an ambient light sensor;

an animate object detector configured to be coupled to the security light such that the security light becomes electrically live when the animate object detector detects an animate object; and a plurality of light emitting diodes (LEDs) installed on the back of the housing that is supported by the mounting fixture, wherein the plurality of LEDs have light emitting portions that are pointed towards the mounting surface to direct light toward the mounting surface in a direction generally opposite to which the security light points when the light fixture is installed on the mounting surface, the ambient light sensor operably coupled to the plurality of LEDs, the plurality of LEDs being configured to illuminate when ambient light is less than a corresponding threshold.

28. The light fixture of claim 27 wherein the light fixture is configured to be mounted on a vertical wall.

29. The light fixture of claim 27 wherein the plurality of LEDs are disposed at various points along an arc.

30. The light fixture of claim 29 wherein the arc comprises at least 45 degrees of curvature.

31. The light fixture of claim 29 wherein the plurality of LEDs are disposed at various points along an arc.

32. A security light fixture comprising:

a mounting housing configured and arranged to facilitate mounting the light fixture to a vertical mounting surface other than ground, the mounting housing having a front and back, the housing including a light socket configured to direct a security light from a security light socket from the front and pointing the security light away from the vertical mounting surface; and a plurality of light emitting diodes (LEDs) on the back of the housing, the plurality of LEDs having light emitting portions that are pointed towards the vertical mounting surface to direct light from the LEDs toward and onto the vertical mounting surface when the fixture is installed on the mounting surface.

33. The light fixture of claim 32 wherein the plurality of LEDs are disposed at various points along an arc.

34. The light fixture of claim 33 wherein the arc comprises at least 45 degrees of curvature.

* * * * *